United States Patent [19]

Van Dest

[11] Patent Number: 4,878,881
[45] Date of Patent: Nov. 7, 1989

[54] FIXED HOMOKINETIC JOINT FOR TRANSMISSIONS OF DRIVING WHEELS OF AUTOMOBILE VEHICLES

[75] Inventor: Jean-Claude Van Dest, Saintry sur Seine, France

[73] Assignee: Glaenzer-Spicer, Poissy, France

[21] Appl. No.: 254,083

[22] Filed: Oct. 6, 1988

[30] Foreign Application Priority Data

Oct. 6, 1987 [FR] France ................ 8713766

[51] Int. Cl.$^4$ .......................... F16D 3/30
[52] U.S. Cl. ..................... 464/111; 464/905
[58] Field of Search ............ 464/111, 132, 905

[56] References Cited

U.S. PATENT DOCUMENTS 4,205,539  6/1980  Orain ................... 464/111
4,291,552  9/1981  Orain ................... 464/111

FOREIGN PATENT DOCUMENTS 1175941  4/1959  France ................ 464/111
1408945  7/1965  France .
2199825  4/1974  France .
 266830  11/1986  Japan ................. 464/111
2080490  2/1982  United Kingdom ...... 464/111

Primary Examiner—Daniel P. Stodola
Attorney, Agent, or Firm—Wenderoth, Lind & Ponack

[57] ABSTRACT

The joint comprises a tulip element (1) connected to a driving shaft and having three axially extending petal portions (8), a tripod element (3) having three radial arms (4) carrying spherical sectors (18) cooperative with inner spherical bearing surfaces (21) of rollers (6) associated with rolling tracks (7) on the tulip element (1). The tripod element is fixed to a bowl element (9) which is connected to a wheel stub-axle (11). Each arm (4) of the tripod element (3) comprises a portion (15) which is off-center in a radial plane relative to a central ball (5). Two flat surfaces (19) are provided between the spherical sectors (18) and an arrangement for axially connecting the tulip element (1) to the tripod element (3) comprises a central spider element (24) having three branches (25) adapted to cap in a radially floating manner the ball (5) of the tripod element. The branches are provided with an arrangement (27) for axially retaining the branches in the tulip element (1), the spider element (24) consequently having two degrees of freedom, namely radially relative to the tulip element and in rotation with the tulip element (1) about the general axis (X—X) of the joint.

9 Claims, 4 Drawing Sheets

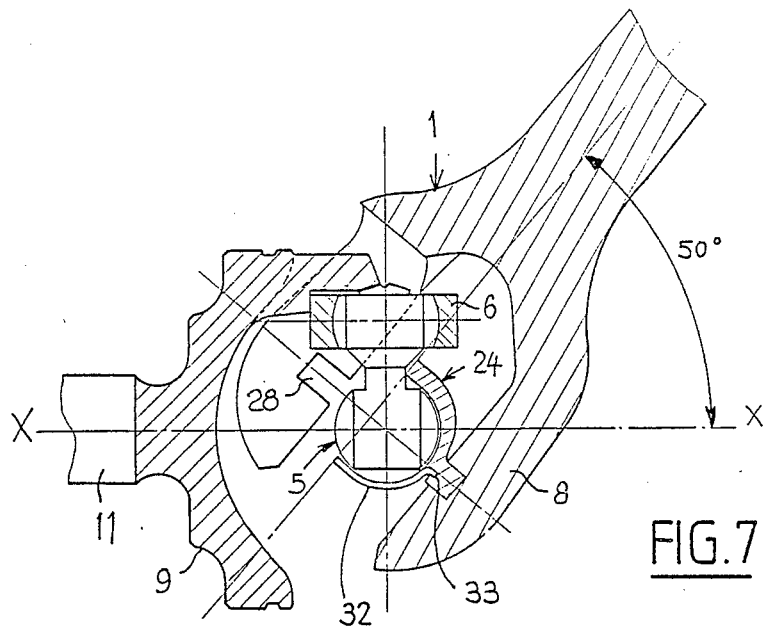
FIG.7
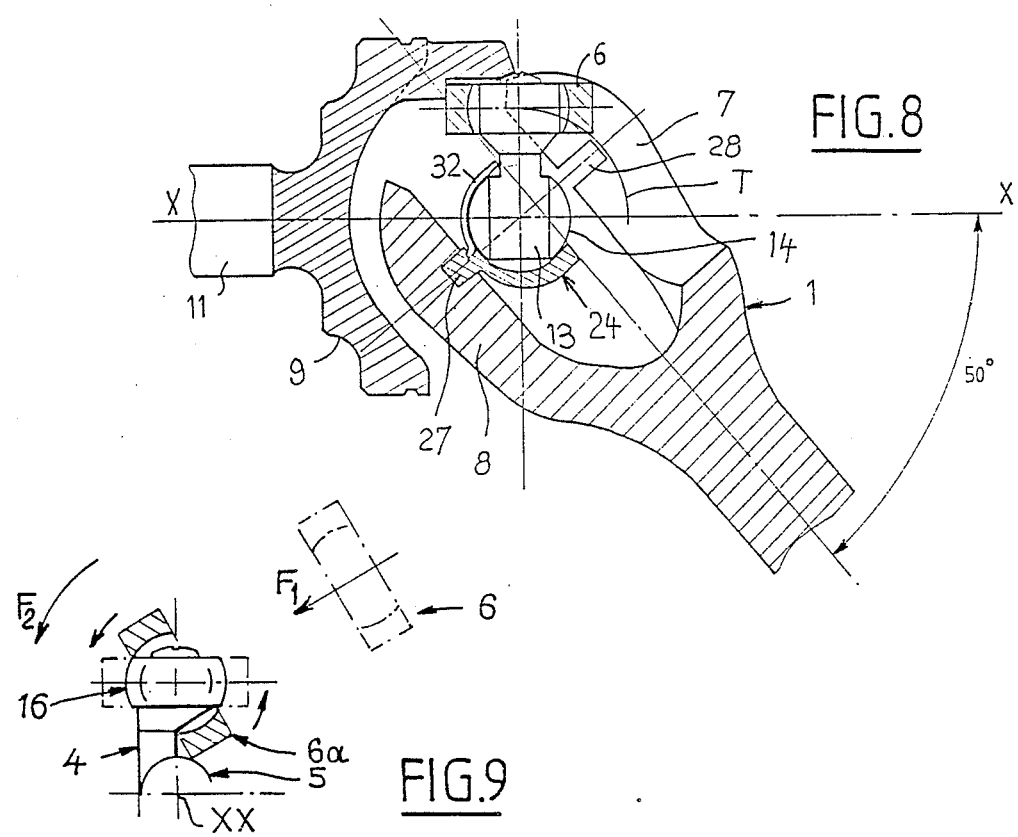
FIG.8
FIG.9

4,878,881

FIXED HOMOKINETIC JOINT FOR TRANSMISSIONS OF DRIVING WHEELS OF AUTOMOBILE VEHICLES

BACKGROUND OF THE INVENTION

The present invention relates to a fixed homokinetic joint for transmissions of driving wheels of automobile vehicles.

More precisely, the joint to which the invention relates is of the type comprising a tulip element connected to a driving shaft and constituted by three axially extending petal portions, a tripod element having three radial arms carrying spherical sectors cooperative with inner spherical bearing surfaces of rollers cooperative with rolling tracks provided on the petal portions of the tulip elements, the tripod element being fixed to a bowl element connected to a wheel stub-axle, and means being provided for axially interconnecting the tulip element and the tripod element.

This type of homokinetic joint is capable of operating at a large flexing angle which however, in practice, cannot at the present time exceed 46.5°.

Further, the relatively small diameter of the shaft of the tulip element necessitates the provision of an intermediate element between the latter and the connecting shaft when the connecting shaft has a large diameter.

SUMMARY OF THE INVENTION

An object of the invention is in particular to increase the maximum flexing angle of a joint of the aforementioned type.

According to the invention, each arm of the tripod element comprises a portion which is off-center in a radial plane relative to a central ball, and two flat surfaces are provided between the spherical sectors, and the means for axially interconnecting the tulip element and the tripod element comprise a central spider element having three branches which are adapted to cap in a radially floating manner the ball of the tripod element and are provided with means for axially retaining the branches in the tulip element, said spider element therefore having two degrees of freedom, namely radially relative to the tulip element and in rotation with the tulip element about the general axis of the joint.

The combination of this radially floating spider element and the off-center portions of the arms of the tripod element permits increasing the maximum flexing angle of the joint up to 50° and more. Indeed, when the joint is operating at the maximum flexing angle, the branches of the spider element come into contact with the off-center portion of the arms of the tripod element, which radially and angularly displaces them in the tulip element.

Furthermore, the presence of the flat surfaces between the spherical sectors of the arms of the tripod element combined with the off-center of these arms, enables a roller having a spherical inner bearing surface to be mounted on each arm.

Further features and advantages of the invention will be apparent from the following description with reference to the accompanying drawings which illustrate an embodiment thereof by way of a non-limitative example.

BRIEF DESCRIPTION OF THE DRAWINGS

In the drawings:

FIGS. 7 and 8 are axial sectional views of the joint in the two opposite maximum flexing angle positions, and FIG. 9 is a partial view illustrating the manner of mounting a roller on the spherical end portion of the corresponding arm of the tripod element.

DETAILED DESCRIPTION OF THE INVENTION

Figure 1:
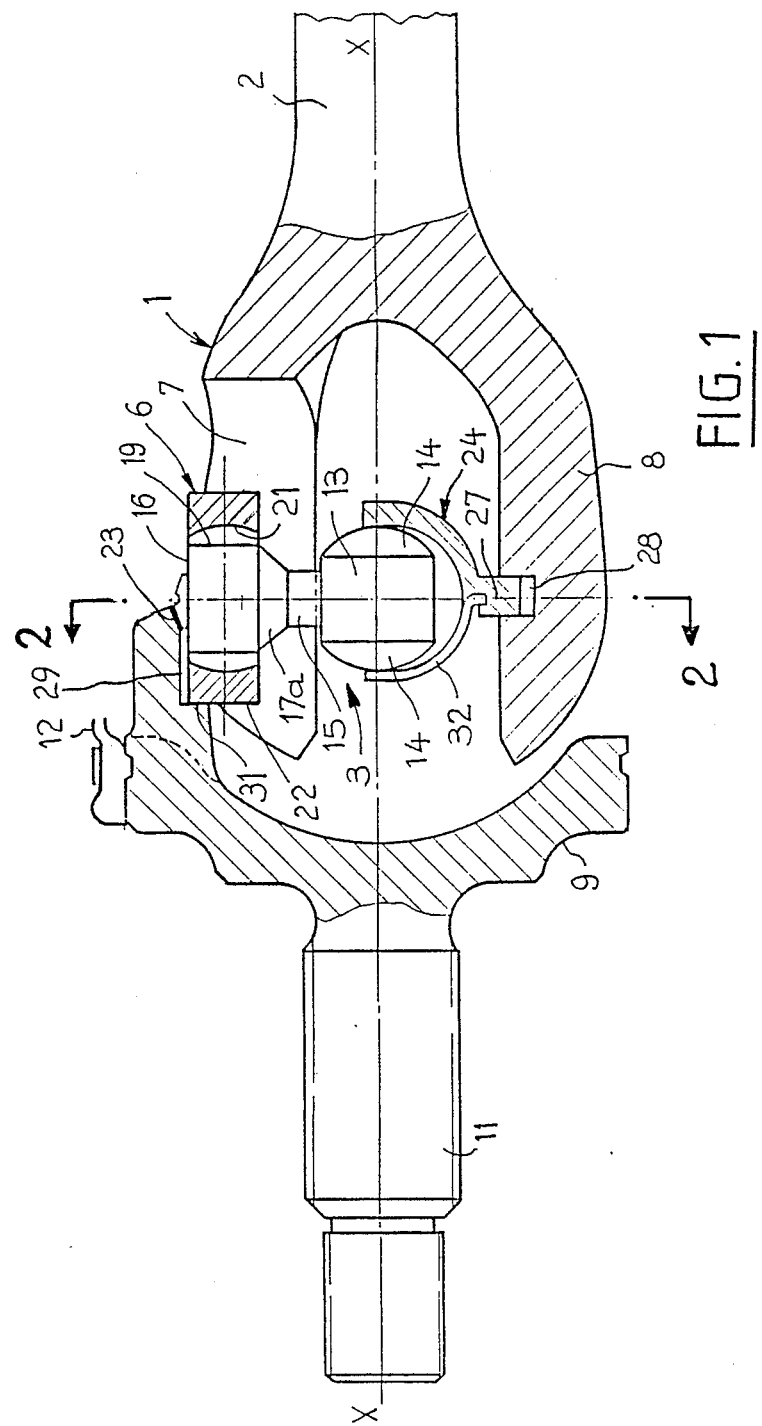
FIG. 1 is an axial, sectional and partly elevational view of an embodiment of the homokinetic joint according to the invention, this joint being shown with a zero flexing angle.
Figure 3:
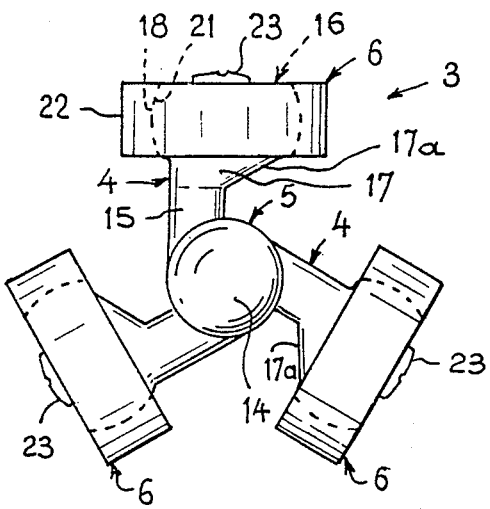
FIG. 3 is an elevational view in the axial direction of a tripod element assembly formed by a tripod element proper and its rolling rollers.

The joint shown in the drawings is a homokinetic joint of the fixed type for automobile vehicle driving wheel transmissions.

This joint comprises a tulip element 1 made in one piece with a driving shaft 2 constituting the output of a differential (not shown), a tripod element 3 having three radial arms 4 extending from a central ball 5, evenly angularly spaced apart and each carrying a roller 6 cooperative with a corresponding rolling track 7 provided on an inner side of a petal portion 8.

The tripod element 3 is fixed to a bowl element 9 which is connected to a wheel stub-axle 11 constituting the output of the joint.

The petal portions 8 are angularly evenly spaced apart and each carry two rolling tracks 7 which are cooperative with a respective roller 6. The tracks 7 extend in a direction parallel to the general axis X—X of the joint which is sealed in the manner known per se by a bellows or gaiters 12 which are only partly shown.

The tripod element 3 is constructed in the following manner: it first of all comprises the central ball 5 which is formed by a cylindrical portion 13 coaxial with the axis XX and, on each side of this cylindrical portion, by two spherical dome portions 14 which are also coaxial with the axis X—X. The three arms 4, which are made in one piece with the ball 5, are each formed by a radial portion 15 which is off-center relative to the axis X—X of the joint in a radial plane and connected to a spherical end portion 16 by an intermediate divergent region 17 defined at one end by a surface 17a which is inclined to the general axis X—X. The off-center portions 15, having a diameter smaller than the diameter of the ball 5, and the inclined surfaces 17a consequently define recesses between the end portions 16 and the ball 5.

The end portion 16 is constituted by two diametrically opposed spherical sectors 18 which are oriented to be perpendicular to the general axis X—X to which the inclined surfaces 17a are connected, and by two axially oriented flat surfaces 19 perpendicular to the axis X—X and provided between the spherical sectors 18. The spherical sectors are cooperative with inner spherical bearing surfaces 21 of the rollers 6 which moreover include outer cylindrical bearing surfaces 22 which are cooperative with the rolling tracks 7.

Each arm 4 terminates in a projecting end portion 23 on which is formed a flat surface for welding the tripod element 3 to the bowl element by means of a laser or electronic bombardment.

Figure 2:
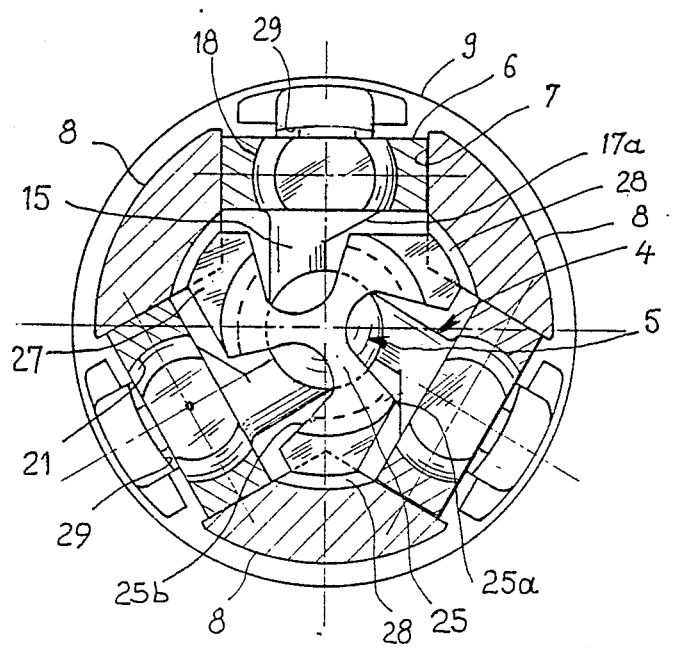
FIG. 2 is a cross sectional view taken on line 2—2 of FIG. 1.
Figure 6:
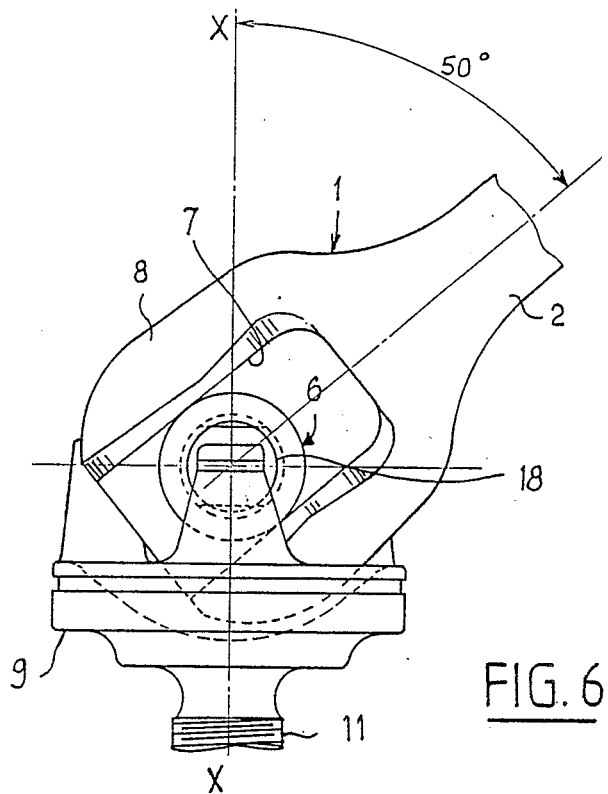
FIG. 6 is an elevational view of the joint of FIGS. 1 and 2 at a maximum flexing angle.
Figures 4, 5:
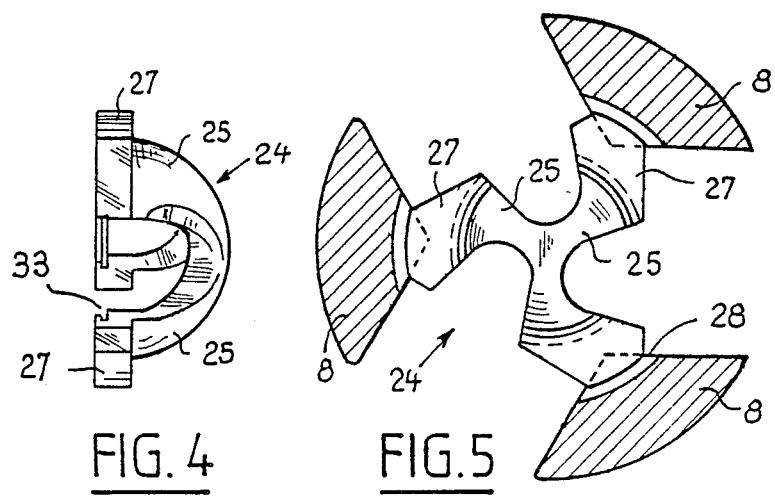
FIG. 4 is a side elevational view of a spider element for axially retaining the tulip element.
FIG. 5 is an elevational view in the axial direction of the spider element of FIG. 4 engaged in the petal portions of the tulip element.

In order to connect the tulip element 1 axially to the tripod element 3, the joint comprises a central spider element 24 having three branches 25 adapted to cap in a radially floating manner the ball 5. For this purpose, the branches 25 are curved and dimensioned to be capable of being interposed between the corresponding arms 4 (FIG. 2) by rolling and swivelling on the spherical dome portion 14 by concave bearing surfaces. Further, the spider element 24 is provided with means for axially retaining it in the tulip element 1. In the illustrated embodiment, this arrangement comprises, on the end of each branch 25, a transverse wing 27 in one piece with the rest of the spider element 24 and radially extending from the corresponding branch 25. Each wing 27 is received with a radial clearance but no axial clearance, in a groove 28 formed in the corresponding petal portion 8, the wings 27 and the grooves 28 being so dimensioned that the wings 27 are radially movable in the grooves 28, the grooves opening at their ends onto the rollers 6.

When the spider element 24 is mounted on the tripod element 3 and its wings 27 are received in the grooves 28, this spider element 24 is thus fixed axially but has two degrees of freedom, namely the possibility of moving radially in the grooves 28 and the possibility of rotating with the tulip element 1 about the general axis X—X of the joint.

Flat surfaces are provided on the inner surface of the bowl element 9 in confronting relation to each roller 6, namely:

- a first transverse flat surface 29 separated by a small gap in the surface of the roller 6, parallel to the general axis X—X, of narrow width but having a depth which is substantially equal to the radius of the roller 6 (FIG. 1);
- and a second flat surface 31 which is a transverse surface perpendicular to the surface 29 and cooperative with the outer cylindrical bearing surface 22 of the associated roller 6.

When the spider element 24 is mounted on the tripod element 3, it is completed by a closing muzzle 32 which caps the second spherical dome 14 and is engaged in grooves 33 formed adjacent to the ends of the branches 25. The muzzle 32 completes the trapping of the ball 5 by the spider element 24 and ensures the maintenance of the whole of the joint.

The technical effect of the advantages of the joint just described are the following:

First of all, the joint is assembled in the following manner: each roller 6 is mounted on an arm 4 as illustrated in FIG. 9, i.e. the roller 6 is presented obliquely relative to the general axis of the arm 4 on the side pertaining to the inclined surface 17a of the latter (arrow F1). Owing to the flat surfaces 9 and the off-center of the portion 15 of the arm 4, the roller 6 may be slid over the end portion 16 until it comes into abutment with the portion 15 between the inclined surface 17a and the ball 5 (Position 6a in FIG. 9). It is then sufficient to tilt the roller 6a about an axis perpendicular to the general axis X—X as indicated by the arrow F2, to terminate the mounting of the roller 6 on the arm 4.

The tripod assembly 3 is then welded, with its rollers 6, to the bowl element 9, preferably by means of a laser as indicated hereinbefore. This technique of welding the assembly 3,6 to the bowl element 9 by means of a laser has the advantage of resulting in only a slight heating of the surrounding regions of the weld. The weld region at the projecting end portion 23 of each arm 4 extends throughout the width of the tripod element, for example 16 mm, which advantageously results in the bowl element 9 participating in the resistance or strength of the tripod element 3 when the joint is subjected to a torsion torque.

Then the spider element 24 is placed in position in the grooves 28, and the assembly constituted by the tulip element 1 and its spider element 24 axially retaining it on the assembly comprising the bowl element 9 and the tripod element 3 provided with the rollers 6, is introduced and welded to the bowl element 9. The joint is made to flex to the position shown in FIG. 7, in which it is possible to place in position on the spider element 24 the cover constituted by the muzzle 32 whose curved edge portions come to be inserted in the grooves 33 in the spider element 24. This muzzle 32, which is preferably made from spring steel, provides the locking of the joint assembly.

The flat surfaces 29, 31 of the bowl element 9 have a double function: On one hand, they maintain the rollers 6 in a position approximately tangent to the path T of the center of the roller 6 on the track 7 of the branch 8 and/or perpendicular to the plane of the tripod element 3. On the other hand, the radial clearance required for absorbing the offset is divided between the spider element 24 and the arms 8 on the one hand, and the spider element 24 and the central ball 5 of the tripod element 3 on the other hand. It should also be noted that the disengagement of the branches 25 of the spider 24 from the grooves 28 is prevented by the contact of the arms 4 with the edges 25a and 25b of the spider element 24.

Obtaining a maximum flexing angle greater than that of the prior joints of the same type, namely about 50° to 51°, is made possible by the following features: small diameter of the arms 4 of the tripod element 3 in the working region of the spider element 24 providing the axial retention (off-center portions 15), and the degree of freedom of rotation of the spider element 24 radially relative to the tulip element 1. Thus, when the joint is at the maximum flexing angle (FIG. 7) the interference (or contact) between the end of a branch 25 and the inclined surface 17a and the off-center portion 15 of the associated arm 4 results in a radial sliding and rotation of the spider element 24 in the grooves 28.

In the position of maximum flexing angle (FIG. 8) symmetrical to the preceeding angle, there is an interference between the muzzle 32 and the off-center portion 15 of the arm 4 which also causes radial sliding of the spider element 24 in the grooves 28.

The joint according to the invention also has the following technical advantages:

As compared to the prior joints of the same type, its mechanical efficiency is increased and permits an installing angle of 10° to 12° larger than the presently possible installing angles (the installing angle is the angle between a horizontal plane and the transverse shaft of transmission between the engine unit and the wheel of the vehicle). Indeed, when the joint operates at a flexing angle, the roller 6 undergoes no axial movement and its axis remains substantially perpendicular to the plane of the path T that its center travels through. Moreover, the area of the spherical bearing surfaces 18, 21 between the roller 6 and the tripod element 3 is so dimensioned as to reduce the contact pressures relative to those existing on the prior joints of the aforementioned type.

The overall axial and radial size of the joint is reduced, since the rolling parts travel on a constant radius relative to the center of the tripod element 3.

Consequently, the foregoing advantages (small overall size and improved efficiency) are related to the arrangement of the cylindrical rollers 6 which swivel and rotate on the spherical bearing surfaces 18 of the tripod element 3.

Further, owing to the configuration of the rollers 6 and the tripod element 3, the offset values at an angle are reduced, which serves to reduce the diametrical overall size of the joint.

To summarize, the main advantages of the joint according to the invention are the following:

1. A maximum flexing angle exceeding or equal to 50° is obtained.

2. Improved mechanical efficiency permitting an installing angle which is larger than the present installing angles which are 6° to 7°. This increase in the installing angle provides the constructor of the vehicle with more freedom for constructing the engine-propelling unit.

3. Possibility of receiving connecting shafts of large diameter with no intermediate element.

4. An overall diameter of the joint less than that of prior joints.

I claim:

1. A fixed homokinetic joint for driving wheel transmissions of automobile vehicles, said joint having a general axis and comprising:
   a tulip element for connection to a drive shaft, said tulip element having three axially extending petal portions, each said petal portion defining a rolling track;
   a tripod element having three radial arms;
   a plurality of rollers, each said roller having an inner spherical bearing surface, and each said roller cooperative with a respective said rolling track on said petal portions;
   spherical sectors carried by each said radial arm and cooperative with a said inner spherical bearing surface of a respective said roller, said spherical sectors of each said radial arm having flat surfaces defined therebetween;
   a bowl element for connection to a wheel stub-axle, said bowl element fixed to said tripod element; and
   means for axially connecting said tulip element to said tripod element;
   said tripod element comprising a central ball, each said radial arm of said tripod element comprising a portion off-center in a radial plane relative to said central ball;
   said means for axially connecting said tulip element to said tripod element comprising a central spider element having three branches adapted to cap, in a radially floating manner, said central ball of said tripod element, and means for axially retaining said branches of said spider element in said tulip element such that said spider element has two degrees of freedom, radially relative to said tulip element and rotationally with said tulip element about said general axis.

2. The fixed homokinetic joint as set forth in claim 1, wherein:
   said radial arms of said tripod element comprise end portions welded to said bowl element, to thereby fix said bowl element to said tripod element.

3. The fixed homokinetic joint as set forth in claim 2, and further comprising:
   a closing muzzle fixed to said three branches of said spider element so as to trap said central ball of said tripod element in said spider element, said muzzle dimensioned so as to be capable of interfering with said off-center portion of said radial arms of said tripod element when said tulip element is at a maximum flexing angle relative to said bowl element.

4. The fixed homokinetic joint as set forth in claim 1, wherein:
   said radial arms of said tripod element comprise end portions welded to said bowl element by means of a laser, to thereby fix said bowl element to said tripod element.

5. The fixed homokinetic joint as set forth in claim 1, wherein:
   said radial arms of said tripod element comprise end portions welded to said bowl element by means of electronic bombardment, to thereby fix said bowl element to said tripod element.

6. The fixed homokinetic joint as set forth in claim 1, wherein:
   said branches of said spider element are curved and have inner bearing surfaces for bearing against said central ball of said tripod element, said branches interposed between said radial arms of said tripod element so as to be capable of contacting said off-center portions of said radial arms to enable radial and angular movement of said spider element relative to said tulip element when said tulip element is at a maximum flexing angle relative to said bowl element.

7. The fixed homokinetic joint as set forth in claim 6, wherein:
   said means for axially retaining said branches of said spider element in said tulip element comprises a radially extending wing on each said branch of said spider element and a groove in each said petal portion of said tulip element, each said radially extending wing movably disposed in a respective said groove.

8. The fixed homokinetic joint as set forth in claim 1 wherein said bowl element has a plurality of flat surfaces on an inner surface thereof, said plurality of flat surfaces comprising:
   a first transverse flat surface parallel to said general axis and with a depth substantially equal to the radii of said rollers; and
   a second flat surface, perpendicular to said first flat surface, each said roller having a cylindrical outer bearing surface cooperating with said second flat surface.

9. The fixed homokinetic joint as set forth in claim 1, wherein:
   each said radial arm of said tripod element has a divergent region inclined relative to said general axis connecting said off-center portion with said spherical sectors.

* * * * *